(12) United States Patent
Balaban et al.

(10) Patent No.: US 6,369,857 B1
(45) Date of Patent: Apr. 9, 2002

(54) RECEIVER FOR ANALOG AND DIGITAL TELEVISION SIGNALS

(75) Inventors: Alvin Reuben Balaban, Lebanon; Michael Louie Low, Kendall Park; Edward Coley Fox, Cranbury, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/311,252

(22) Filed: May 13, 1999

(51) Int. Cl.⁷ ................................................. H04N 5/46
(52) U.S. Cl. ....................... 348/555; 348/558
(58) Field of Search ................................. 348/554–558, 348/731–732, 725, 726; 375/316; H04N 5/46

(56) References Cited

U.S. PATENT DOCUMENTS

| | | | |
|---|---|---|---|
| 5,283,653 A | 2/1994 | Citta | |
| 5,557,337 A | 9/1996 | Scarpa | |
| 5,572,264 A | * 11/1996 | Mizukami et al. | 348/735 |
| 5,982,457 A | 11/1999 | Limberg | |

FOREIGN PATENT DOCUMENTS

| | | |
|---|---|---|
| GB | 2338854 A | 12/1999 |
| WO | WO 98/14005 | 4/1998 |

OTHER PUBLICATIONS

Booth, Stephen A, "Digital TV In The U.S.", *IEEE Spectrum*, Mar. 1999, pp. 39–46.
Fox, Barry, "Digital TV Comes Down to Earth", Europe Report, *IEEE Spectrum*, Oct. 1998, pp. 23–30.
T. Nelson, Line Locked Digital Colour Decoding, *Phillips Data Handbook IC22*, Parution: mai 1986, pp. 44–50.
Sgrignoli, Gary et al., "VSB Modulation Used For Terrestrial And Cable Broadcasts", *IEEE Transactions on Consumer Electronics*, vol. 41, No. 3, Aug. 1995, pp. 367–382.
News: "Philips Semiconductors continues i . . . the Consumer Electronics Show, Las Vegas," Jan. 8, 1998, EIC–860/650, 4 pages.
Bryan, D. A. et al., "A Digital Vestigial–Sideband (VSB) Channel Decoder IC For Digital TV (DTV)", date unknown, 7 pages.
"900MHZ Down Converter Consumes Little Power (HFA3101)", Application Note AN9528.1, Harris Corporation Nov. 1996, 1 page.
"SAW Components Vestigial Sideband Filter", Siemens Matsushita Components Data Sheet, M 4951 M, OFW E UE Jan. 1, 1998, 4 pages.
43.8 Mhz V5B Filter for CATV Applications, Part No. 851100, SAWTEK Data Sheet, Aug. 14, 1996, 1 page.

(List continued on next page.)

*Primary Examiner*—Michael Lee
(74) *Attorney, Agent, or Firm*—William J. Burke (57) ABSTRACT

A receiver requiring only a single IF SAW filter and IF amplifier receives signals in both analog format and in digital format, such as the NTSC, PAL and SECAM analog television signal formats and the ATSC and DVB digital television signal formats. IF signals from the IF amplifier are sub-sampled to digital signal form and are processed by respective analog format and digital format processors. Control circuitry responsive to the presence of certain unique components of the signals in analog format and digital format determine which of the analog format and digital format processors is producing valid data and selects the valid data to be utilized. In a television receiver, the unique components of the signals may include carrier signals, synchronization signals, pilot signals and symbol timing, and valid data is applied to a television display.

36 Claims, 7 Drawing Sheets

OTHER PUBLICATIONS

"SAW Components Vestigial Sideband Filter", Siemens Matsushita Components Data Sheet, M 4952 M, OFW E UE Jan. 1, 1998, 4 pages.

"ADS823 10–Bit, 60MHz Sampling Analog–to–Digital Converter," *Burr–Brown IC Data Book, Linear & Mixed Signal Products*, 1998, 7 pages.

"Reducing The Minimum Decimation Factor Of The HSP50016 Digital Down Converter", Application Note AN9401.1 Harris Corporation, Jan. 1999, pp. 3–321 to 3–332.

"Preliminary Specification Video Input Processor (VIP) SAA7111," *Phillips Data Handbook IC22*, Parution: mai 1986, pp. 487–541.

"CA7607, CA7611, Video IF Amplifier System for Color and Black and White TV Receivers," *RCA Integrated Circuits for Linear Applications*, 1986, pp. 1030–1033.

* cited by examiner

RECEIVER FOR ANALOG AND DIGITAL TELEVISION SIGNALS

The present invention relates to receivers and, in particular, to a receiver for analog and digital signals.

For over half a century, television signals have been broadcast in accordance with standardized analog signal formats, such as the NTSC format in the United States, the PAL format in Europe, and the SECAM format in France. Analog television signal formats have inherent limitations that preclude further improvement of picture quality, however, those inherent limitations can be overcome by broadcasting television signals in a digital format. Happily, advances in the design and processing of digital integrated circuits of ever increasing complexity and capability has resulted in sophisticated digital signal processing becoming available in a practical form and at reasonable cost.

Present digital television signal broadcast formats include the Digital Video Broadcast (DVB) format in use in Europe and the Advanced Television Standards Committee (ATSC) formats, such as ATSC format A/53 in use in the United States. Unfortunately, the various systems proposed and/or adopted for transmission of television signals in digital format are not compatible with the existing processing of television signals in analog format. This incompatibility arises not only because one format is analog and the other digital, but also because the signal processing at radio frequencies (RF) and/or at intermediate frequencies (IF) required to properly receive the formats are also different, such as in required filtering. Filtering at IF is typically implemented in surface acoustic wave (SAW) filters and SAW filters for NTSC signals should have a vestigial-sideband filter characteristic and those for ATSC signals should have a root-cosine filter or a "roofing" (flat) filter characteristic.

Figure 1:
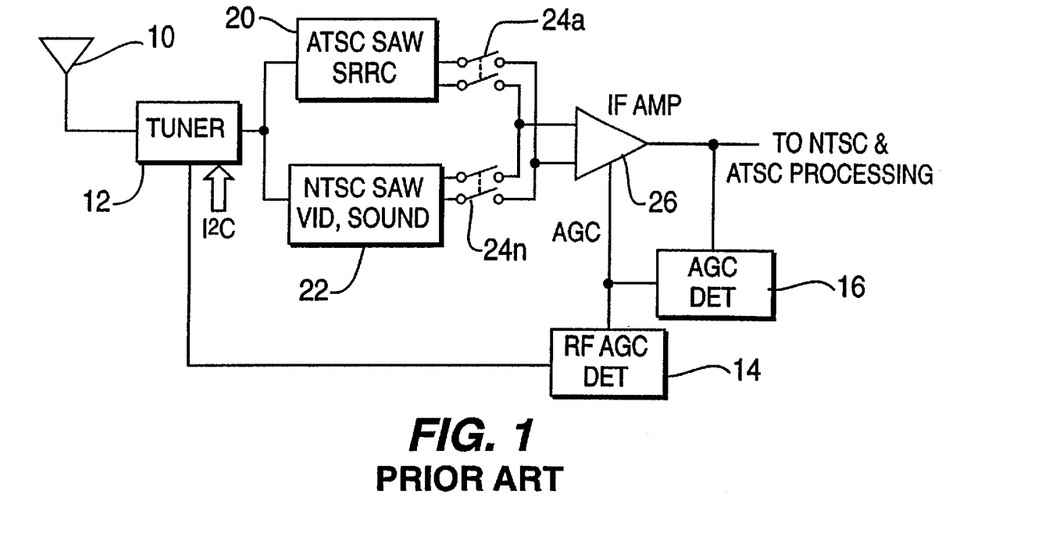
FIG. 1 is a schematic block diagram of a conventional prior art television receiver having dual IF filters.

The conventional approach to a receiver for receiving television signals in both analog and digital formats have required dual SAW filters and dual IF amplifiers, one set for each format, thereby undesirably increasing the complexity and cost of the television receiver and possibly introducing electrical interference. One such prior art arrangement is shown in FIG. 1. RF television signals received at antenna 10 (which may include a cable TV signal input as well as an air wave broadcast signal input) are down converted to the IF frequency, typically about 44–45 megahertz (MHZ) by RF tuner 12 whose gain is controlled to amplitude limit the RF signal in response to RF automatic gain control (AGC) detector 14. Frequency synthesis, band switching and filter tuning of tuner 12 is controlled in response to control signals received via a conventional I²C control data bus from a micro-controller. ATSC SAW filter 20 selects the bandwidth of an ATSC format signal at the IF frequency, typically about a 6 MHZ bandwidth for an ATSC format signal, which is applied to IF amplifier 26 when switch 24a is closed. Similarly, an NTSC SAW filter 22 selects the bandwidth of an NTSC signal at the IF frequency, typically about a 5.75 MHZ bandwidth, for an NTSC format signal which is applied to IF amplifier 26 when switch 24n is closed. In this example, the complication of IF switches 24a, 24n is introduced to avoid plural IF amplifiers. The IF signal from IF amplifier 26 is down converted to baseband for conventional analog signal processing of NTSC analog format signals and is digitally processed for ATSC digital format signals, to reproduce the transmitted program as a displayed picture and sound program. The IF signal from IF amplifier 26 is also applied to automatic gain control (AGC) detector 16 for gain-controlling IF amplifier 26, and in conjunction with RF AGC detector 14, controlling the gain of tuner 12.

In the United States, for example, the change over from all-NTSC analog format broadcasting to all-ATSC digital format broadcasting will be phased in gradually over many years so as not to instantly obsolete the installed base of existing NTSC television transmitters and receivers. Initially, only a few of the available programs may be in digital format and only a few of the broadcast channels will be changed from NTSC analog format to ATSC digital format, and later additional programs and channels will be converted. This leads to a further problem with the prior art arrangement of FIG. 1 in that the operation of ATSC and NTSC selection switches 24a and 24n is undefined in view of the unknown and unpredictable program and channel broadcast patterns in any particular geographical area.

Accordingly, there is a need for a receiver that can receive both analog format and digital format signals without the added complexity of dual IF filters. In addition, it is desirable that such receiver automatically select whether the received signal is in analog format or in digital format.

To this end, a receiver of the present invention comprises a tuner for converting input signals to IF signals, the input signals being in either one of an analog signal format and a digital signal format, an IF filter having a passband for passing the IF signals, and an IF amplifier for amplifying the IF signals. A first signal processor processes the IF signals that are in the analog signal format and a second signal processor processes the IF signals that are in the digital signal format.

In another aspect of the present invention, a method of receiving a signal which may be in either one of an analog signal format or a digital signal format comprises:

receiving the signal as if it is in the analog signal format, and detecting a signal characteristic thereof unique to the analog signal format;

receiving the signal as if it is in the digital signal format, and detecting a signal characteristic thereof unique to the digital signal format;

responsive to the detected signal characteristics unique to the analog signal format and to the digital signal format, respectively, selecting one of the analog signal format and the digital signal format as a received signal format; and receiving the signal in the selected one of the analog signal format and the digital signal format.

BRIEF DESCRIPTION OF THE DRAWING

The detailed description of the preferred embodiments of the present invention will be more easily and better understood when read in conjunction with the FIGURES of the Drawing which include.

DESCRIPTION OF THE PREFERRED EMBODIMENT

Figure 2:
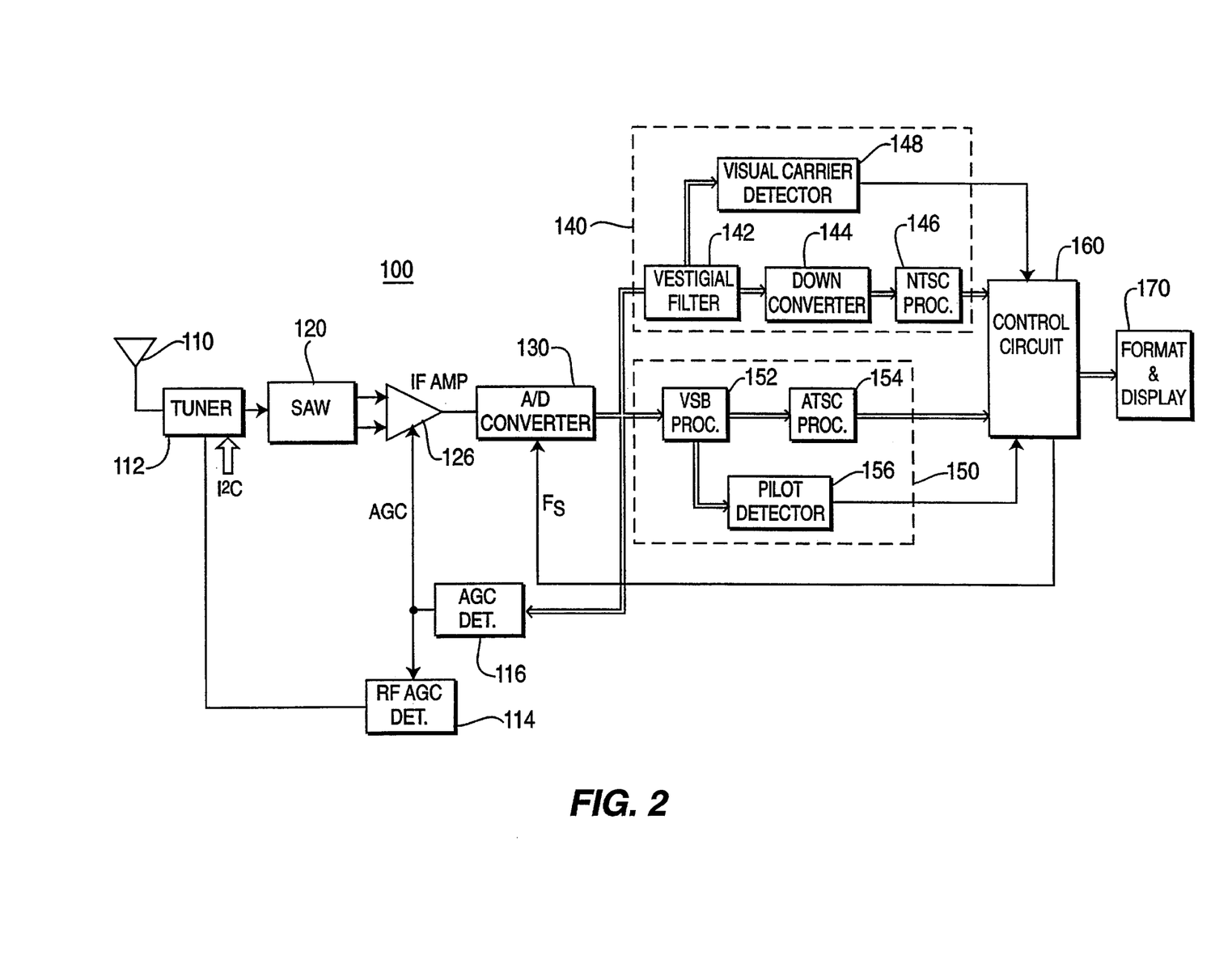
FIG. 2 is a schematic block diagram of an exemplary embodiment of a receiver for receiving television signals in analog format and in digital format in accordance with the present invention.
Figure 3A:
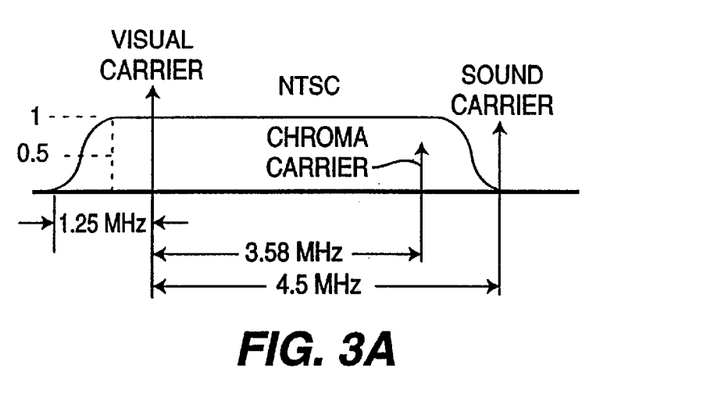
FIGS. 3A and 3B are frequency spectrum diagrams for NTSC format television signals and for ATSC format television signals, respectively.

FIG. 2 is a schematic block diagram of a receiver 100 for receiving television signals in analog format and in digital format in accordance with the present invention, and for displaying a television picture in response thereto. In the following description, signals including information in an analog format are exemplified by NTSC format signals and signals including information in a digital format are exemplified by ATSC format signals. FIG. 3A is a frequency spectrum diagram of an NTSC analog format television signal in which the analog luminance or picture signal is amplitude modulated onto a picture carrier (or visual carrier) which coincides with the RF carrier frequency when transmitted by broadcast, cable, satellite or other medium. The color content of the picture, also known as the chrominance or "chroma" signal, is modulated onto a chroma carrier that is at a frequency 3.58 MHZ higher in frequency than the picture carrier, and the audio program is frequency modulated onto a sound carrier that is at a frequency that is 4.5 MHZ higher in frequency than the picture carrier. It is noted that the modulated luminance signal has a portion of the lower sideband remaining that extends about 1.25 MHZ below the picture carrier frequency, and which must be filtered out in processing the NTSC signal in a receiver, and so only about 4 MHZ or less of the available bandwidth of 6 MHZ is utilized for luminance signal. After the NTSC format signal is down converted to the IF frequency, the picture carrier is at the frequency typically designated as the IF frequency, and the spectrum us "flipped" from that shown in FIG. 3A, i.e. the chroma and sound carriers are at frequencies 3.58 MHZ and 4.5 MHZ, respectively, lower than the IF frequency.

Figure 3B:
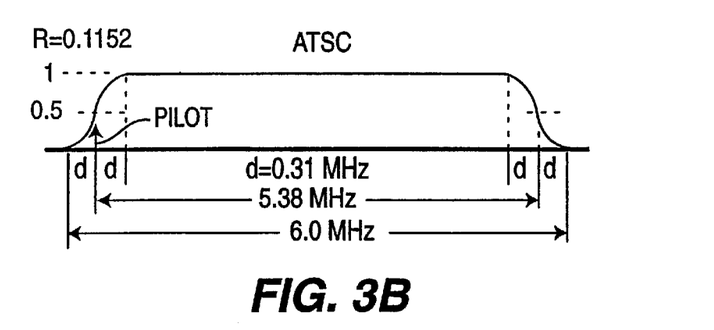

FIG. 3B is a frequency spectrum diagram of an ATSC digital format television signal in which the digitally coded and modulated television signal occupies 5.38 MHZ of the available 6 MHZ channel bandwidth. An ATSC pilot carrier inserted at the lower frequency band edge coincides with the RF carrier frequency when transmitted by broadcast, cable, satellite or other medium. All of the picture and sound program information is encoded in modulated sequences of digital data in the ATSC digital format, and so there are no separate chroma or sound carriers. The digital data formats, coding and signal processing schemes employed in the digital format television signals, while not necessary for understanding the present invention, are described, for example, in G. Sgrignoli et al, "VSB Modulation Used For Terrestrial and Cable Broadcasts," *IEEE Transactions on Consumer Electronics*, Vol. 41, No. 3, August 1995, pages 367–382.

Returning to FIG. 2, RF television signals received at antenna 110 (which may include a cable or satellite TV signal input as well as an air-wave broadcast signal input) are down converted to the IF frequency, typically about 44–45 MHZ by RF tuner 112 whose gain is controlled to amplitude limit the RF signal in response to RF automatic gain control (AGC) detector 114. Tuner 112 includes a frequency synthesizer to generate the frequency signal that is mixed with the incoming RF signal for down conversion thereof to the IF frequency. The frequency synthesizer typically employs a crystal oscillator operating at about 4 MHZ and a phase-locked loop including a controllable frequency divider having its division ratio established in response to control signals received via a conventional I²C control data bus from a micro-controller. Band switching and filter tuning of tuner 112 is also controlled in response to the control signals received via the I²C control data bus. Tuners and tuner components are conventional and are available from many sources, for example, a type HFA3101 900MHZ down converter available from Harris Semiconductor located in Melbourne, Fla., or types TDA9819/9829T IF down converters available from Philips Semiconductors located in Eindhoven, The Netherlands and Sunnyvale, Calif.

SAW filter 120 selects a bandwidth of the signal at the IF frequency, typically about a 6 MHZ bandwidth of the down-converted RF signal, whether the RF signal is an ATSC format signal or is an NTSC signal, which is applied to the input of IF amplifier 126. Suitable SAW filters are available from several sources, such as the types M 4951M and M 4952 M 45.75 MHZ SAW filters available from Siemens Matsushita Components located in Germany and Japan. Suitable IF amplifiers are available from several sources, such as the type CA 7607 and CA7611 video IF amplifiers available from Harris Semiconductor located in Melbourne, Fla., and originally available from RCA Solid State, Somerville, N.J. In accordance with the present invention, a single SAW filter and a single IF amplifier are required in the IF section to filter and amplify the IF signal whether the IF signal includes information in a digital format or in an analog format, although additional SAW filters and IF amplifiers may be employed where a receiver is to receive more than one channel of television signal at the same time.

The IF signal from IF amplifier 126 is then applied to an analog-to-digital (A/D) converter 130 which converts the analog IF signal into a digital signal, i.e. into a sequence of digital data values or digital words at the sampling frequency $f_s$ at which the A/D converter 130 is operated, which digital data values correspond to the amplitudes of the analog IF signal waveform at the times of sampling at the sampling frequency $f_s$. A/D converter 130 is typically a 10-bit A/D converter and may be a flash converter, a pipelined converter or a converter employing a combination of flash and pipeline processing. Suitable AD converters are available from several sources, such as the type ADS823 10-bit, 60 MHZ sampling A/D converter available from Burr-Brown Corporation located in Tucson, Ariz, or the type TDA8763 ADC available from Philips Semiconductors located in Eindhoven, The Netherlands and Sunnyvale, Calif.

When the IF frequency and the A/D converter 130 sampling frequency $f_s$ are properly selected, then the respective processing of the digital data words for analog format signals and for digital format signals is simplified, at least in that the same sampling frequency $f_s$ may be employed regardless of whether the signal is in analog format or digital format. The sampling nature of A/D converter 130 results in down conversion in frequency of the IF signal and the generation of replicas of the IF signal spectrum at the sum and differences of the IF and sampling frequencies. The sampling frequency $f_s$ is selected so that the frequency translated IF center frequency is greater than one half the desired signal bandwidth and so that the absolute value of the frequency translated IF center frequency is greater than the desired signal bandwidth. This avoids the introduction of aliasing signals into the sampled signal components that would not be removed by subsequent processing of the digital signal by NTSC and ATSC processing sections 140, 150.

For example, consider a case wherein the IF frequency bandwidth is selected to be centered at 44 MHZ, so that the NTSC picture carrier will be at 45.75 MHZ and the ATSC pilot carrier will be at 46.69 MHZ. If the sampling frequency $f_s$ of A/D converter 130 is selected to be 25 MHZ, then an NTSC processing section 140 that selects the first lower frequency image of the IF signal spectrum will receive a digital signal from A/D converter 130 having the NTSC picture carrier at 20.75 MHZ at which frequency it is conveniently filtered, as described below in relation to vestigial filter 142. In the same instance, an ATSC processing section 150 that selects the second lower frequency image of the IF signal spectrum will receive a digital signal having the ATSC pilot carrier at 3.31 MHZ which is convenient for the subsequent processing of ATSC format signals. This arrangement allows vestigial sideband filtering of the NTSC analog format signals and enables pilot carrier extraction for the ATSC digital format signals.

The digital signal generated by A/D converter 130 operating at a sampling frequency $f_s$ of 25 MHZ when applied to an NTSC processing section that selects the first lower frequency image of the IF signal spectrum will be a digital signal having the NTSC picture carrier at 20.75 MHZ at which frequency it is conveniently filtered by a vestigial sideband filter. Likewise, the digital signal generated by A/D converter 130 operating at a sampling frequency $f_s$ of 25 MHZ when applied to an ATSC processing section 150 that selects the second lower frequency image of the IF signal spectrum will be a digital signal having the ATSC pilot carrier at 3.31 MHZ at which frequency it is conveniently processed by an ATSC vestigial sideband (VSB) processor. This arrangement allows vestigial sideband filtering of the NTSC analog format signals and enables pilot carrier extraction for the ATSC digital format signals.

The digital signal generated by A/D converter 130 operating at a sampling frequency $f_s$ is applied to an NTSC processing section 140 that includes a digital vestigial sideband filter 142. A vestigial sideband filter 142 has a vestigial-sideband-filter characteristic to linearly attenuate the NTSC signal at frequencies near the picture carrier so as to remove the effect of the vestigial sideband that is on the opposite side of the picture carrier frequency. The vestigial sideband if not removed would erroneously increase the low frequency content of the NTSC luminance signal. Vestigial sideband filter 142 is implemented as an infinite impulse response (IIR) or a finite impulse response (FIR) digital filter comprising a delay line having a series of delay stages, weighting blocks to weight the signals at various taps along the delay line, and a summing block to combine the various weighted delayed signals.

The filtered digital NTSC signal is thereafter down converted to baseband by a digital down converter 144 from which it is processed conventionally by NTSC processor 146 to recover the digital luminance and chrominance signals that are, if an NTSC format signal is received, passed by control circuit 160 to be combined, formatted and displayed by display 170, such as a cathode ray tube, plasma display, LCD panel or other display device. Suitable down converters include, for example, the type HSP50016 digital down converter available from Harris Semiconductor located in Melbourne, Fla. Suitable NTSC processors include, for example, type SAA7111 video input processor available from Philips Semiconductors located in Eindhoven, The Netherlands and Sunnyvale, Calif.

In addition, the digital signal generated by A/D converter 130 operating at a sampling frequency $f_s$ is applied to an ATSC processing section 150 that includes a vestigial sideband (VSB) processor 152. VSB processor 152 demodulates the digital data words to produce at baseband the encoded stream of digital values transmitted by the originating station free of the synchronization and timing signals associated therewith. The digital data words from VSB processor 152 are applied to ATSC processor which decodes the picture information therefrom, typically in the standard MPEG-2 format. If an ATSC format signal is received, the MPEG-2 digital data stream from ATSC processor 154 is passed by control circuit 160 to be decoded from MPEG-2 format, combined, formatted and displayed by display 170, such as a cathode ray tube, plasma display, LCD panel or other display device. Suitable VSB and ATSC processors include types MCT 2100 and MCT 4000 available from Motorola Semiconductor located in Scottsdale, Ariz., and type TDA8960 available from Philips Semiconductors located in Eindhoven, The Netherlands and Sunnyvale, Calif.

Figure 4:
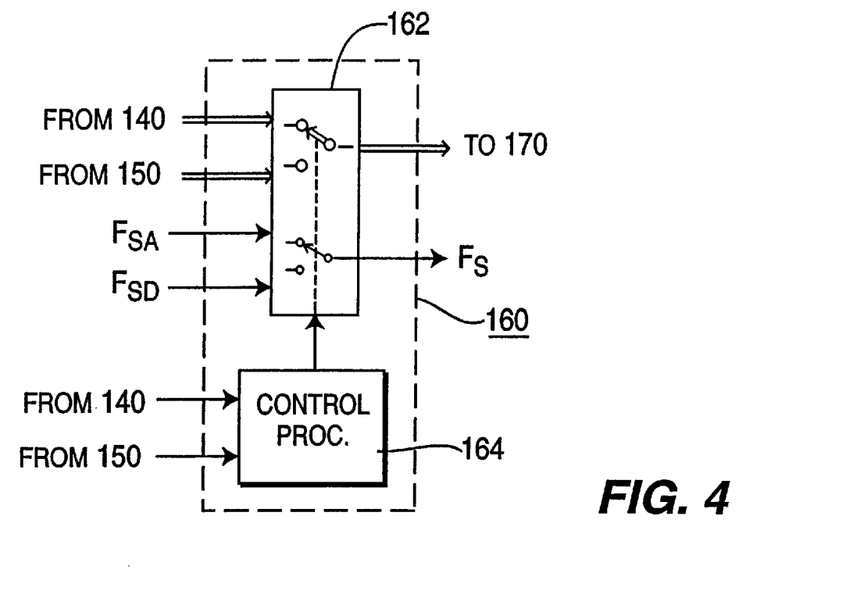
FIG. 4 is a schematic block diagram of an exemplary control circuit useful in the embodiment of FIG. 2.

FIG. 4 is a schematic block diagram of an exemplary control circuit 160 useful in the embodiment of FIG. 2. Control circuit 160 includes a switch or multiplexer 162 that operates as a two-to-one switch to pass processed digital data generated by NTSC section 140 from NTSC format received signals when NTSC format signals are received and to pass processed digital data generated by ATSC section 150 from ATSC format received signals when ATSC format signals are received. In fact each of the two-to-one switches includes a number of parallel paths or channels equal to the number of bits in the digital data to be passed, typically 8-bit-wide paths for 8-bit digital data words. Switch 162 is controlled to select NTSC or ATSC digital data by control processor 164 which is responsive to control inputs from NTSC section 140 and ATSC section 150 applied thereto. Control circuit 160 is responsive either directly or indirectly to the IF signals for selecting the appropriate one of the analog section 140 and digital section 150 outputs. Control circuit 160 may be responsive, for example, to the IF signal produced by IF amplifier 126, or to the digital representation thereof produced by A/D converter 130, or to a processed signal responsive thereto such as the digital data from vestigial filter 142 and/or VSB processor 152.

Control circuit 160 may also include a second switching function within switch 162 where it is desired that A/D converter 130 operate at different sampling frequencies as a function of the format of the received signals. A first sampling frequency signal $f_{sa}$ is provided through switch 162 as sampling signal $f_s$ when signals in the analog signal format are received and a second sampling frequency signal $f_{sd}$ is provided as sampling signal $f_s$ when signals in the digital signal format are received. The sources of the sampling frequency signals are conventional.

In particular, switching of control circuit 160 is responsive to respective data signals generated by each of NTSC section 140 and ATSC section 150 indicating the presence of proper NTSC and proper ATSC formatted signals, respectively. In a basic form, control processor 164 is simply responsive to outputs from carrier detector 148 and/or from pilot detector 156. Visual carrier detector 148 of NTSC section 140 generates a carrier-present signal when digitized NTSC format signals are applied to vestigial sideband filter 142. Similarly, pilot detector 156 of ATSC section 150 generates a carrier-present signal when digitized ATSC format signals are applied to VSB processor 152. Carrier detector 148 and pilot detector 156 can be implemented as phase locked loops that only lock to the carrier signal or pilot signal to be detected or may be implemented in other ways.

Figure 5A:
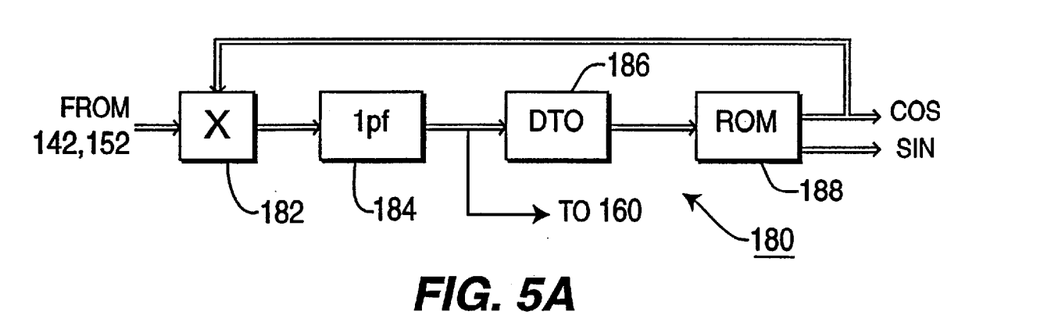
FIGS. 5A and 5B are schematic block diagrams of two alternative exemplary embodiments of carrier and pilot tone detectors useful with the embodiment of FIG. 2.

FIG. 5A is a schematic block diagram of an exemplary embodiment of a digital detector 180 that may be utilized for carrier detector 148 or pilot detector 156. Detector 180 employs a digital phase-locked loop (PLL). Multiplier 182 which serves as the phase detector of the phase-locked loop receives the digital data words representing the input signal at one input and the PLL output frequency, nominally that of the NTSC picture carrier frequency in the case of detector 148 and that of the ATSC pilot carrier in the case of detector 156, at the other input thereof. The PLL output frequency may be the cosine signal output, the sine signal output, a square-wave signal output or other convenient form. If the input data words are of the proper signal type, i.e. of the NTSC or of the ATSC format signals, as the case may be, then multiplier 182 generates an output that is filtered by digital low-pass loop filter 184 and is indicative of the presence or absence of the input signal carrier being sought. Alternatively, an in-phase detector including a digital low-pass filter preceded by a second multiplier having as its inputs the data words from 142, 152 and the sine output from ROM 188 can be employed to provide a positive value signal to control circuit 160. The output from loop filter 184 controls discrete time oscillator (DTO) 186, the input of which represents the ratio of the desired output frequency and its clock frequency, i.e. unity when the clock frequency is that of the carrier to be detected and the carrier to be detected is present. The output of DTO 186 is applied to read only memory 198 which contains a look-up table of the values of the sine and cosine values of the DTO 186 output, and the PLL output signal is applied to multiplier 182 to complete the PLL.

Figure 5B:
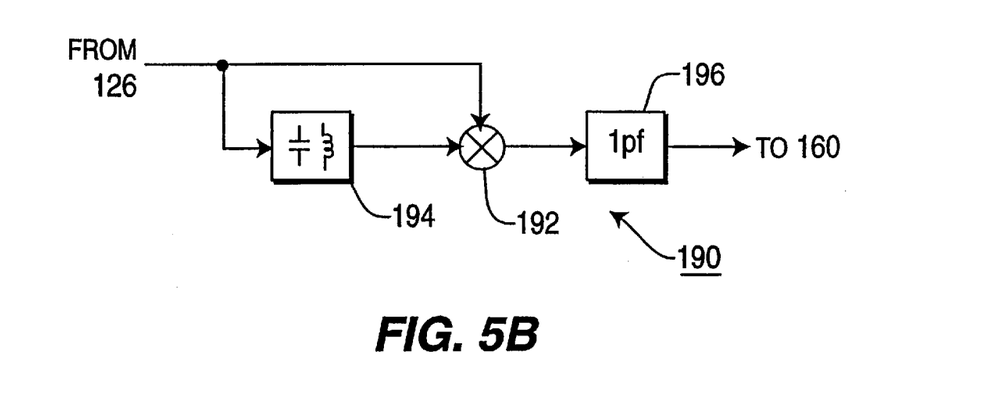

FIG. 5B is a schematic block diagram of an exemplary embodiment of an analog detector 190 that may be utilized for carrier detector 148 or pilot detector 156. Detector 190 is of the sort known as an "exalted carrier" detector. An analog input signal from IF amplifier 126 including a carrier signal (or a pilot signal, as the case may be) is applied directly to a first input of a mixer 192 and is filtered and applied also to the second input of the mixer 192. In particular, narrow-band tuned filter 194 exhibits a narrow passband response at the nominal frequency of the signal to be detected, for example, at the picture carrier frequency in the case of NTSC carrier detector 148 and at the pilot frequency in the case of ATSC pilot detector 156. Only if the proper input signal is present will narrowband filter 194 apply any signal to mixer 192, in which case the output signal from mixer 192 when filtered by low-pass filter 196 will be a high level that can be acted upon by control circuit 160 as an indication of the presence of the carrier signal or the pilot carrier, as the case may be. When a proper input signal is absent, filter 194 produces no output and so neither does mixer 192 and low pass filter 196, and control circuit 160 receives a low-level signal indicating absence of the carrier signal or the pilot carrier, as the case may be.

Because receiver 100 will receive either an NTSC format signal or an ATSC format signal or no signal, only one of detectors 148 and 156 will provide a carrier-present signal at any time, thereby to uniquely and correctly actuate control circuit 160. If neither an NTSC nor an ATSC format signal is received, neither carrier detector 148 nor pilot detector 156 produces a carrier-present signal and control circuit 160 takes a default state. The default state may be to close the switch 162 to select the NTSC signal path, or to close the switch 162 to select the ATSC signal path, as convenient, or perhaps opening both the NTSC and the ATSC paths so that a blank display or other predetermined display results. It may be convenient to select the default condition of control circuit 160 depending upon whether NTSC or ATSC signal transmissions predominate at the time of manufacture of the receiver, or to provide a user-selectable default condition such as by a simple switch or through a programming feature. Alternatively, the default condition could be to select a predetermined one of the NTSC or of the ATSC signal path, or to select the last-received signal. Further, only one detector need be employed to detect the presence of one of the NTSC or ATSC format signals and actuate control circuit 160.

Advantages of the foregoing arrangement include that the receiver automatically adapts to the particular format of the signal being received, whether that be in an analog format or in a digital format. This is especially desirable where a broadcaster may be transmitting in an analog format at certain times and in a digital format at other times, or when a particular program source changes over from an analog format to a digital format. In addition, when a receiver is programmed by operation in a search mode, as is the case when a new receiver is first operated or when a receiver is reprogrammed after a power outage, the analog format and digital format detections made during the search mode can be stored to later set up the proper format for each channel when that channel is selected by the user.

Figure 6:
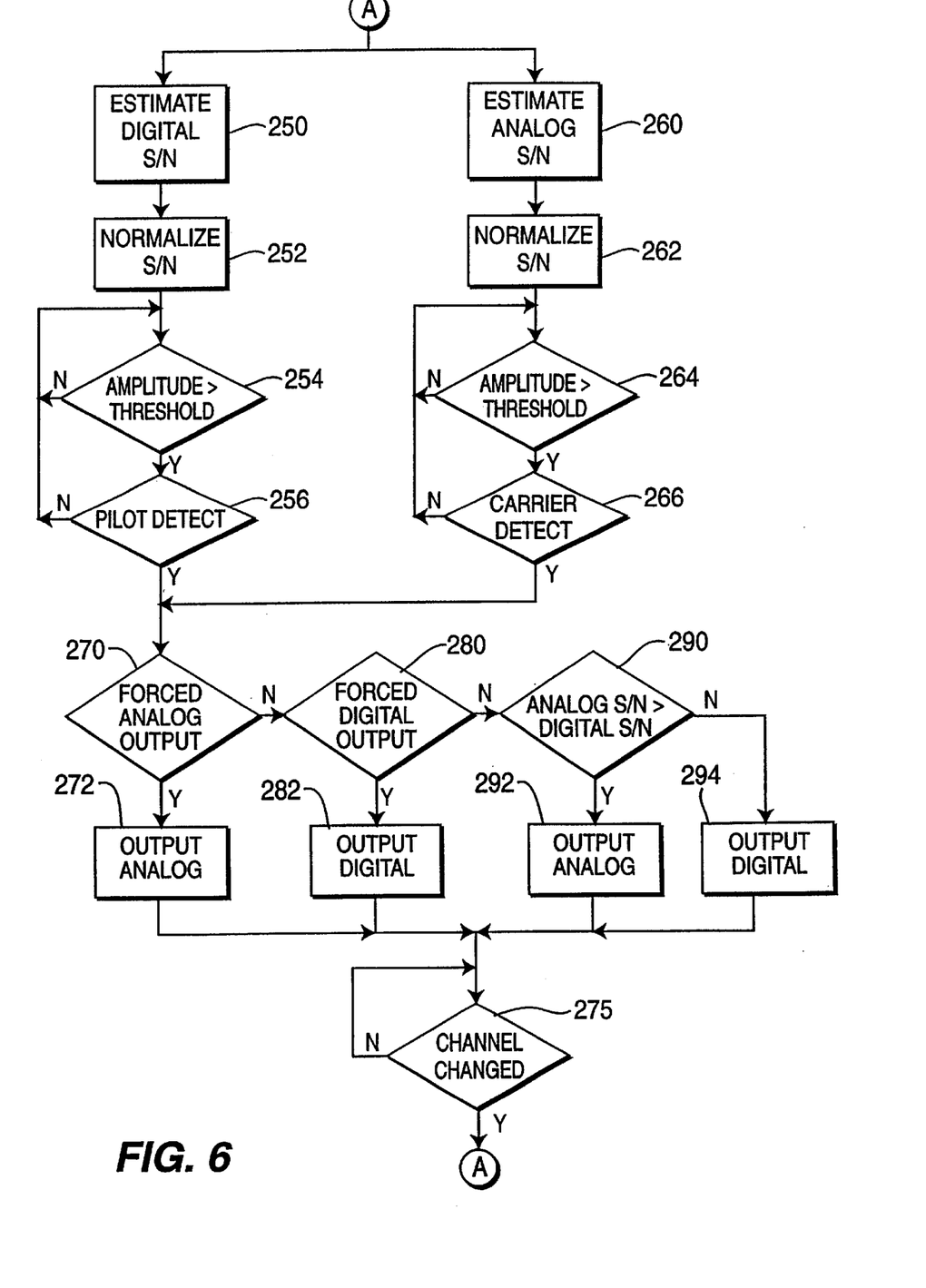
FIGS. 6 and 7 are schematic flow diagrams relating to alternative embodiments relating to the exemplary control circuit of FIG. 4.

FIG. 6 is a schematic flow diagram describing an alternative operation of control processor 164 of the exemplary control circuit 160 of FIG. 4. Beginning at "A" both the left-hand and the right-hand paths are preferably executed in parallel, thereby to reduce the time required to complete the entire process. In the left-hand path, the presence or absence of a valid digital format television signal is determined. The signal-to-noise ratio of the received digital format signal, if any, is estimated 250, such as from received signal amplitude as reflected in the AGC control signals for IF amplifier 126 and for the RF amplifier of tuner 112. In addition and alternatively, an indication of signal-to-noise ratio may be obtained for ATSC digital format signals, for example, by calculation from the magnitudes of a substantial number of the samples of the in-phase and quadrature component signals, i.e. the I and Q digital data words, thereof. The representation of the estimated digital signal-to-noise ratio is normalized 252 so as to facilitate processing and comparison later in the process. If the comparison 254 of the amplitude of the signal-to-noise ratio representation exceeds a predetermined threshold, then the presence of the digital format pilot signal is detected 256 to confirm that the received signal is indeed a valid signal in the digital format. However, if the aforementioned amplitude is less than the predetermined threshold value or if the pilot signal is not detected, control processor 164 awaits the presence of a normalized digital signal-to-noise representation that exceeds the predetermined threshold.

In the right-hand path of FIG. 6, the presence or absence of a valid analog format television signal is determined. The signal-to-noise ratio of the received analog format signal, if any, is estimated 260, such as indicated by the amplitude of the analog visual carrier signal at the input to IF amplifier 126, for example. Alternatively, such indication may be obtained, for example, from the magnitude of the IF AGC control signal. The representation of the estimated signal-to-noise ratio is normalized 262 so as to facilitate processing and comparison later in the process. If the comparison 264 reveals that the amplitude of the analog signal-to-noise ratio representation exceeds a predetermined threshold value, then the presence of the analog visual carrier signal is detected 266 to confirm that the received signal is indeed a valid signal in the analog format. However, if the aforementioned amplitude is less than the predetermined threshold or if the carrier signal is not detected, control processor 164 awaits the presence of a normalized analog signal-to-noise representation that exceeds the predetermined threshold.

The indications of the presence of one or neither of an analog-format signal and a digital-format signal, in conjunction with user-selected preferences, if any, are compared 270, 280, 290 to control 272, 282, 292, 294 which of the analog section 140 and digital section 150 outputs is connected by switch 162 to display 170. A user-determined preference may be made to select only those signals received in the digital format or only those received in the analog format, or may be on a station-by-station basis (i.e. according to the channel selected). If the selected preference is to force selection of an analog format signal, selection 270 is implemented by control processor 164 for switch 162 to pass 272 the output of analog section 140. If the selected preference is to force selection of a digital format signal, selection 280 is implemented by control processor 164 for switch 162 to pass 282 the output of digital section 150.

If the user has not selected a forced preference 270, 280, then comparison 290 of the respective normalized signal-to-noise representations of the analog format and digital format signals determines the selection of the output signal to be displayed. If a valid analog format signal is present, its normalized signal-to-noise representation will be greater than that of the absent digital format signal and the analog format signal is selected 292. Conversely, if a valid digital format signal is present, its normalized signal-to-noise representation will be greater than that of the absent analog format signal and the digital format signal is selected 294. Note that both an analog format signal and a digital format signal cannot be received simultaneously on the same channel because a transmission will be in one format or the other, should both be received as may occur in rare over-the-airwaves broadcast conditions, such as in co-channel interference, for example, comparison 290 will select the one signal having the higher normalized signal-to-noise representation which is likely to be the desired signal.

In any of the foregoing cases, once an output signal to be displayed is selected 272, 282, 292, 294, control processor 164 awaits a channel change at the occurrence of which is detected 275 to begin anew the signal format determination and selection process of FIG. 6.

Figures 7, 7A:
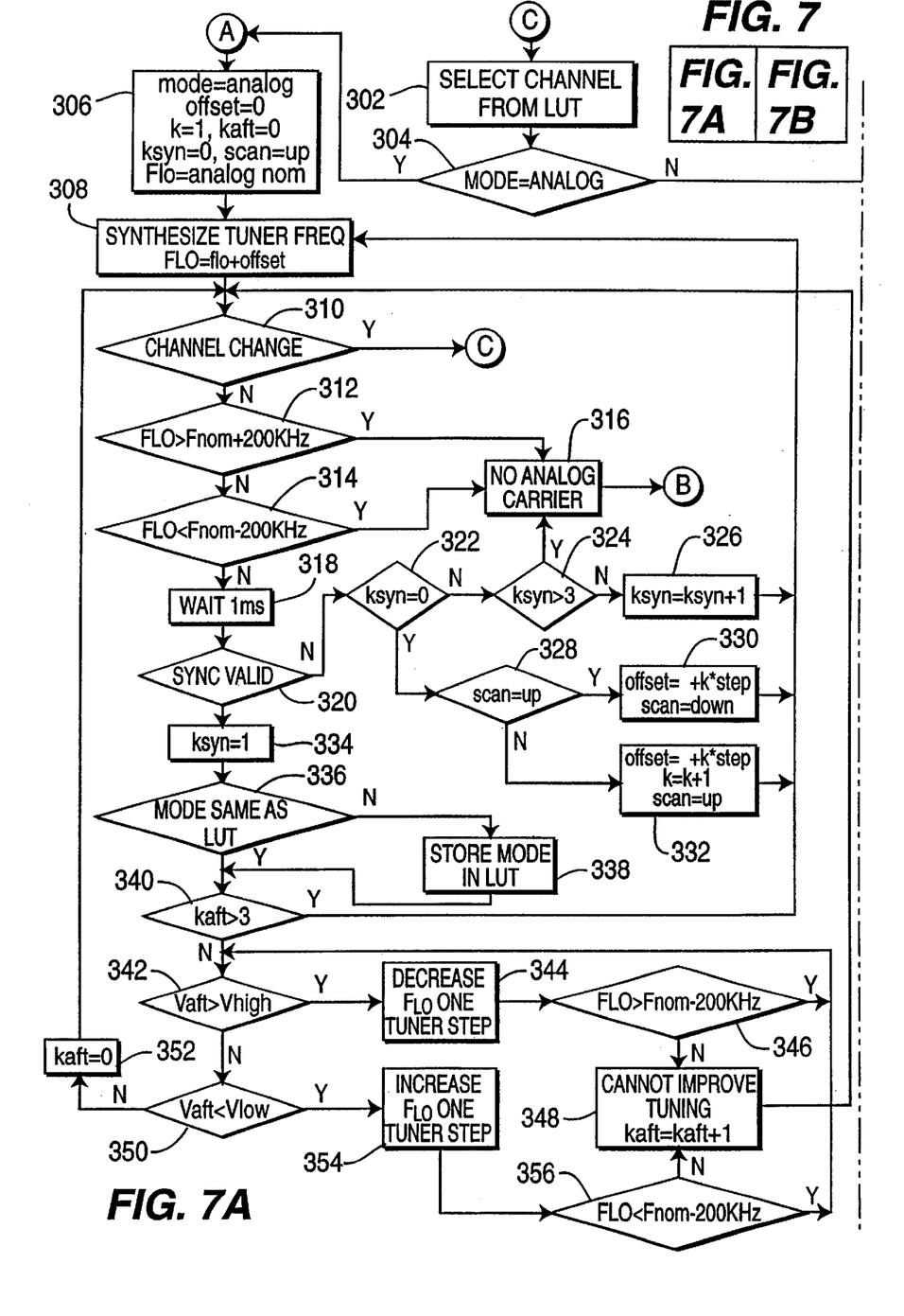
Figure 7B:
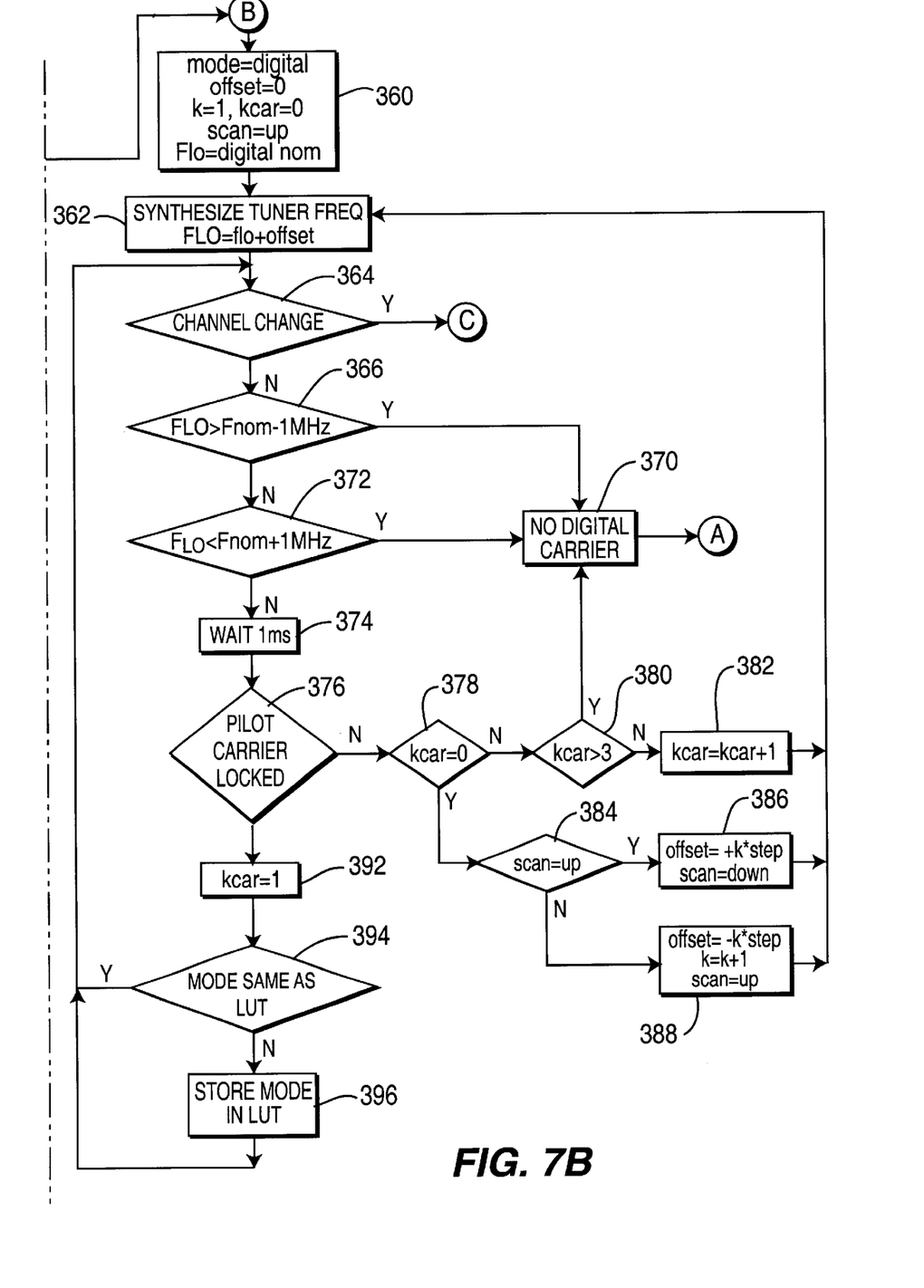

FIG. 7 is a schematic flow diagram describing a further alternative operation of control processor 164 of the exemplary control circuit 160 of FIG. 4 that is more complex than those described above. Operation of control processor 164 thereof requires a tuner 120 including an automatic frequency control (AFC) feature. Operation thereof commences from "C" with the retrieval 302 of mode information for the selected channel from a look-up table (LUT) as may be stored in a memory such as a random access memory (RAM), preferably a non-volatile memory. The LUT includes for each channel receivable the mode, i.e. analog format or digital format, applicable to signals received on each particular channel. The contents of the LUT may be set by the manufacturer or may be established by a channel program sequence that may be initiated by a user or may be initiated automatically whenever electrical power is first applied to the receiver.

At channel selection, if the mode indication produced 302 indicates 304 that an analog format signal is expected, then the left-hand flow beginning at "A" is commenced. First, the mode is set to "analog" as in analog format signal reception and the frequency synthesizer constants of tuner 112 are initialized 306 for predetermined nominal reception conditions by setting the frequency "offset" (from nominal) to zero, setting the number of frequency steps "k" to be used in the channel-finding scan to one so that the frequency step is one times the preselected frequency step value (e.g., 50 KHz), setting the AFT correction "$k_{aft}$" to zero, setting a constant $k_{syn}$ that is used in a timing function to zero, setting the tuner scan direction to "up," and setting the tuner local oscillator frequency "$f_{LO}$" to the nominal value to select the selected channel if its carrier is at the nominal frequency value. The initialized 306 constants are applied to synthesize 308 the tuner 112 local oscillator frequency $F_{LO}$ for carrier lock under the predetermined nominal conditions and the subsequent adjustment 308 of the tuner 112 local oscillator FLO for proper carrier lock, i.e. $F_{LO}=f_{LO}+\text{offset}$.

If there is a channel change 310, then the process begins anew at "C" as before. If not, the portion of the operation that improves the accuracy of the tuning beyond that achieved by adjustment 308 of the local oscillator, and the testing for the presence of a valid analog format signal is as follows. The local oscillator frequency FLO is tested 312, 314 for the presence of a valid analog carrier signal, i.e. a carrier signal that is within a predetermined deviation of the nominal carrier frequency, e.g., within ±200 KHz thereof. If no valid analog carrier is present 316, then operation transfers to "B" to commence tuning and testing for the presence of a valid digital format signal, as is described below. If a valid analog format carrier signal is present, a delay 318 time is allowed for the tuning system to settle into a stable operating condition. Typically, a one millisecond delay is sufficient.

After the delay 318, the presence of a unique analog format signal characteristic, for example, a valid analog format synchronization signal (sync), is tested 320 for. If valid sync is not present, the tuner tuning is adjusted to attempt to re-tune slightly so as to acquire valid analog format sync. Specifically, if a comparison 322 shows that ksyn=0, the local oscillator frequency is adjusted 330 by incrementing 330 the number of steps k and thus the offset and scanning down if the tuning was in the scan up mode 328, and by decrementing 332 the constant k and the offset and changing to scan up if the tuning was in the scan down mode 328. If comparison 322 shows that ksyn is not zero, ksyn is incremented 326 by one if ksyn is 3 or less, however, if ksyn>3 is found 324, there have been four unsuccessful attempts to find valid analog format sync and the operation proceeds through the no analog carrier 316 point to "B" to test for reception of a digital format signal.

On the other hand, if valid analog format signal sync is detected 320, the presence of both valid carrier and valid sync confirms the reception of a valid analog format signal. Then ksyn is set to unity 334. and the information stored in the look-up table is updated. If the LUT information indicates 336 that the mode is other than analog format, then the analog mode indication is stored 338 in the LUT, but if the mode stored in the LUT is analog format, nothing is done. A final verification 340 of proper signal reception is made by testing the AFT control to see whether it is within acceptable limits from its zero or center value. If kaft is too high, for example, kaft >3, which may indicate the tuner is locked onto a spurious signal, an adjacent channel or other unselected carrier, operation returns to adjustment 308 of the tuner 112 frequency synthesizer for proper carrier lock; otherwise, operation proceeds as follows.

Having found, locked and verified the presence of an analog format signal, the operation next seeks to further improve the tuning by adjusting the AFT conditions. If an AFT signal above a predetermined threshold is detected 342, the tuner 112 local oscillator frequency FLO is decreased 344 by one step and is tested 346 to determine whether it remains within the predetermined −200 KHz allowable deviation below nominal frequency. Similarly, if an AFT signal below a predetermined threshold is detected 350, the tuner 112 local oscillator frequency FLO is increased 354 by one step and is tested 356 to determine whether it remains within the predetermined +200 KHz allowable deviation above nominal frequency. If testing 346, 356 indicates an FLO within the allowable tolerances, then tuning may be able to be further improved and the testing 342, 350 sequence is repeated until one of two conditions is reached. If tests 346, 356 produce a negative result, then tuning cannot be improved 348 and kaft is incremented by one, control processor 164 sets switch 162 to pass the analog format signals from analog section 140, and the operation returns to awaiting a channel change 310. If, however, the testing and adjusting sequence 342–344–346 or 350, 354, 356 continues to the point where the AFT signal Vaft is in between the thresholds Vhigh and Vlow, then kaft is set 352 to zero, control processor 164 sets switch 162 to pass the analog format signals from analog section 140, and the operation returns to awaiting a channel change 310. This completes the operation when a valid analog format signal is received at tuner 112 and is locked and verified.

Returning to "B" when the presence of a digital format signal is to be tested for, either as a result of a decision 304 or a no analog carrier determination 316, the tuner 112 is first set up and tries to lock onto a digital pilot carrier signal. First, the frequency synthesizer constants of tuner 112 are initialized 360 for predetermined nominal reception conditions by setting the frequency "offset" (from nominal) to zero, setting the number of frequency steps "k" to be used in the channel-finding scan to one so that the frequency step is one times the preselected frequency step value (e.g., 50 KHz), setting a constant $k_{car}$ that is used in a timing function to zero, setting the tuner scan direction to "up," and setting the tuner local oscillator frequency "$f_{LO}$" to the nominal value to select the selected channel if its pilot carrier is at the nominal frequency value. The initialized 360 constants are applied to synthesize 362 the tuner 112 local oscillator frequency $F_{LO}$ for carrier lock under the predetermined nominal conditions and the subsequent adjustment 362 of the tuner 112 local oscillator FLO for proper carrier lock, i.e. $F_{LO}=f_{LO}+$offset.

If there is a channel change 364, then the process begins anew at "C" as before. If not, the portion of the operation that improves the accuracy of the tuning beyond that achieved by adjustment 362 of the local oscillator, and the testing for the presence of a valid digital format signal is as follows. The local oscillator frequency FLO is tested 366, 372 for the presence of a valid digital pilot carrier signal, i.e. a pilot signal that is within a predetermined deviation of the nominal carrier frequency, e.g., within ±1 MHZ thereof. If no valid digital pilot carrier signal is present 370, then operation transfers to "A" to commence tuning and testing for the presence of a valid analog format signal, as is described above. If a valid digital format pilot carrier signal is present, a delay 374 time is allowed for the tuning system to settle into a stable operating condition. Typically, a one millisecond delay is sufficient.

After the delay 374, testing 376 for the presence of a unique digital format signal characteristic is performed. Such testing may include, for example, a locking to a valid digital format pilot signal, as stated in block 376, or a valid timing and recovery of the symbols representing information in the digital signal format. If valid pilot lock is not present, the tuner tuning is adjusted to attempt to re-tune slightly so as to acquire valid analog format sync. Specifically, if a comparison 378 shows that kcar =0, the local oscillator frequency is adjusted 330 by incrementing 386 the number of steps k and thus the offset and scanning down if the tuning was in the scan up mode 384, and by decrementing 388 the constant k and the offset and changing to scan up if the tuning was in the scan down mode 384. If comparison 378 shows that kcar is not zero, kcar is incremented 382 by one if kcar is 3 or less, however, if kcar>3 is found 380, there have been four unsuccessful attempts to find valid digital format pilot and the operation proceeds through the no digital pilot carrier 370 point to "A" to test for reception of a analog format signal.

On the other hand, if valid digital format signal lock is detected 376, the presence and lock of a valid pilot carrier confirms the reception of a valid digital format signal. Then kcar is set to unity 392. and the information stored in the look-up table is updated. If the LUT information indicates 394 that the mode is other than digital format, then the digital mode indication is stored 396 in the LUT, but if the mode stored in the LUT is digital format, nothing is done. Control processor 164 sets switch 162 to pass the digital format signals from digital section 150, and the operation returns to awaiting a channel change 364. This completes the operation when a valid digital format signal is received at tuner 112 and is locked and verified.

The digitized IF signal from A/D converter 130 is also applied to a digital automatic gain control (AGC) detector 116, as shown in FIG. 2, for gain-controlling IF amplifier 126, and in conjunction with RF AGC detector 114, controlling the gain of tuner 112. It is noted that IF AGC detector 114 and RF AGC detector cooperate to apportion the total available gain between the amplifiers in tuner 112 and IF amplifier 126 so as to maintain high signal-to-noise ratio when signals of moderate to weak strength are received and to avoid signal distortion when signals of high strength are received.

Figure 8A:
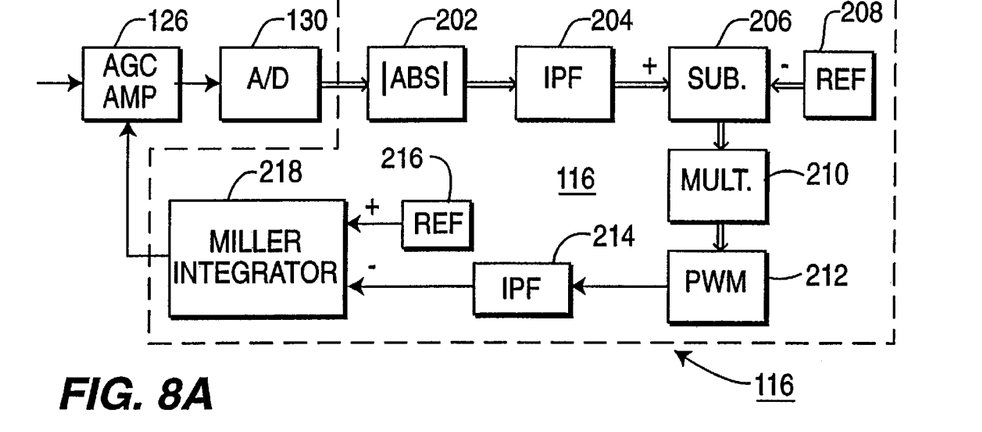
FIGS. 8A and 8B are schematic block diagrams of alternative embodiments of digital gain controls useful in the receiver of FIG. 2.
Figure 8B:
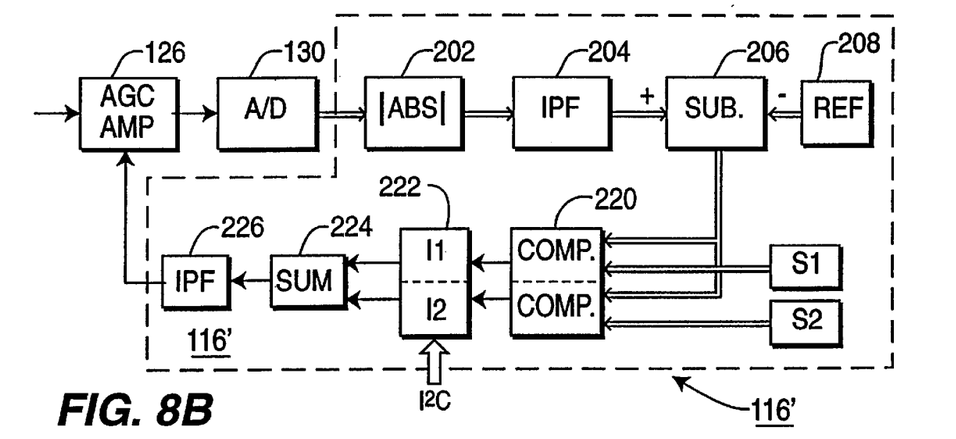

FIGS. 8A and 8B are schematic block diagrams of alternative exemplary embodiments of a digital automatic gain control 116 that is useful in the receiver 100 of FIG. 2, for example, to provide AGC to IF amplifier 126 thereof. The sequence of digital data words produced at the output of A/D converter 130 represents the amplitude of the signal at the output of IF amplifier 126 to which an AGC control signal is to be applied. The digital data words are first stripped of their sign (i.e. polarity) by absolute value circuit 202 the output of which is the sequence of digital data words of all the same sign, e.g., all are positive amplitude values. These digital data words are low-pass filtered by digital low pass filter 204, which may be of the IIR or the FIR type. Reference source 208 provides a digital reference value against which each of the digital data words are compared, such as by a digital subtractor 206. The sequence of data words produced by subtractor 206 is an error signal that represents in sign and magnitude the difference between the actual average amplitude of the digital data words generated by A/D converter 130 and the desired value thereof as represented by the reference value of reference source 208, which is directly related to the difference between the average amplitude of the signals at the output of IF amplifier 126 and the desired amplitude thereof. Given the negative feedback sense of the AGC loop including AGC amplifier 126, A/D converter 130 and AGC detector 116, the error signal at the output of subtractor 206 tends to be driven towards a value of zero.

The gain of the AGC function is increased by amplifying the error signal from subtractor 206 by a gain factor, as may be realized by a digital multiplier 210 that multiplies the input value (multiplicand) received by the gain factor (multiplier). The product thereof is applied to a pulse width modulator (PWM) 212 that converts the digital value of the product to a pulse duty cycle (i.e. the ratio of the time the PWM output signal is at a high level to the time it is at both the high and low levels in a given cycle). The output of PWM 212 can vary between 0% and 100% duty cycle, i.e. between always being at the low level (e.g., 0 volts) and always being at the high level (e.g., +5 volts). At any duty cycle therebetween, the output of PWM 212 alternates between the high and low levels and so has an average value that represents the amplified error signal, but also has a sequence of transitions that have a high AC content as well. Analog low-pass filter 214 reduces the AC content caused by the PWM transitions so that only an acceptably small AC ripple signal remains on the amplified error signal. This ripple signal is further attenuated while the amplified DC error signal is further amplified by a Miller integrator 218 that exhibits an extremely high gain at DC, e.g., 50 dB, and a very long time constant, e.g., 0.1 seconds. The signal level from Miller integrator 218 is applied to the gain control input of IF amplifier 126 to control the gain thereof. Preferably, the ripple content of the AGC signal produced by Miller integrator 218 is very low so as not to modulate the gain of IF amplifier 126, which modulation would introduce amplitude modulation of the IF signal and modulation products in the signals demodulated therefrom.

Miller integrator 218 also receives a reference signal from reference source 216 for setting its operating center level. If a single polarity voltage supply Vss is utilized, then reference source 216 provides a potential of about Vss/2. Thus, the reference source 216 value preferably is centered between the values of the most positive supply potential and of the most negative supply potential, e.g., between +Vss volts and zero volts. If both positive and negative polarity voltage supplies are utilized, then reference source 216 provides a potential of about zero volts, or ground potential. Thus, reference source 216 may be implemented as a resistive voltage divider or, with both polarity voltage supplies, as a connection to ground.

Where A/D converter 130 is a twos-complement 10-bit converter, its output data words have values between −512 and +511 and so the outputs from absolute value circuit 202 and low pass filter 204 have values between 0 and +511. If the value of reference 208 is at the center value, i.e. about 255, then the range of outputs produced by subtractor 206 is between −255 and +256, and is symmetrical in that the maximum values of the positive error value and of the negative error value are about the same.

It is preferred that the "gain" from the output of subtractor 206 to the input to Miller integrator 218, e.g., the millivolts change per unit of digital error value change, be high so as to minimize the offset error and/or drift introduced by any inaccuracy in and any change of reference source 216. If, however, the value of reference source 208 is not centered, then the range of output values produced by subtractor 206 becomes asymmetrical. For example, if the reference 208 value is 130, then the range of subtractor 206 is from −130 to +392, and the ability of PWM 212 and Miller integrator 218 to slew the AGC signal to amplifier 126 will likewise be asymmetrical. Thus, the slew rate of the AGC signal will vary depending upon the value of reference source 208 and will likely be asymmetrical.

In the AGC detector 116' of FIG. 8B, AGC amplifier 126, A/D converter 130, absolute value circuit 202, low-pass filter 204 subtractor 206 and reference source 208 are as described in relation to FIG. 8A. As above, the negative feedback sense of the AGC loop including AGC amplifier 126, A/D converter 130 and AGC detector 116', tends to drive the error signal at the output of subtractor 206 towards a value of zero. The error value output produced by subtractor 206 is applied to comparator 220 for controlling controllable current source 222. If comparator 220 detects an error signal of a first polarity it controls current source 222 to produce a current of a first polarity to increase the signal at summer 224, which may be a capacitor or a capacitor and a resistor. If comparator 220 detects an error signal of the opposite polarity it controls current source 222 to produce a current of the opposite polarity to decrease the signal at summer 224. The signal level of summer 224 is low-pass filtered to reduce any ripple thereon by low-pass filter 226 and is applied to the gain control input of IF amplifier 126 to control the gain thereof.

Figure 9:
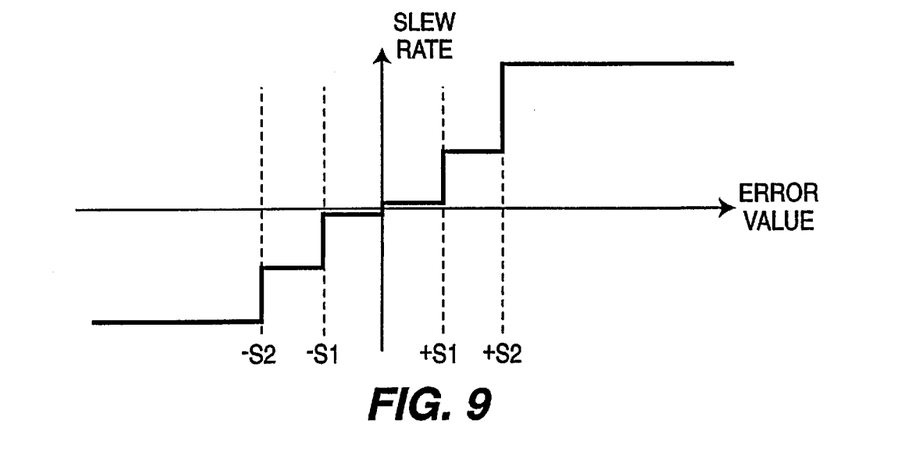
FIG. 9 is a graphical representation of a slew rate characteristic of the embodiment of FIG. 8B.

Preferably, comparator 220 is responsive not only to the polarity of the error value from subtractor 206, but is also responsive to the magnitude thereof for reducing the magnitude of the ripple signal generated at summer 224 and for increasing the slew rate of the signal generated at summer 224. To this end, comparator receives at least one threshold value S1, and preferably two threshold values S1, S2, against which the error value from subtractor 206 is compared. If the magnitude of the error value from subtractor 206 is less than the threshold value S1, comparator 220 controls current source 222 to produce a low magnitude current i1 of a polarity corresponding to the polarity of the error value. This is typically the condition where the AGC level is at the desired level and the level of ripple signal at summer 224 is low. If the magnitude of the error value from subtractor 206 is greater than the threshold value S1 and less than the threshold value S2, comparator 220 controls current source 222 to produce a current i1 of greater magnitude and of a polarity corresponding to the polarity of the error value, so that the rate of change of signal at summer 224 is increased and the slew rate of AGC detector 116' is likewise increased. If the magnitude of the error value from subtractor 206 is also greater than the threshold value S2, comparator 220 controls current source 222 to also produce an additional current i2 of a polarity corresponding to the polarity of the error value, so that the rate of change of signal at summer 224 is further increased and the slew rate of AGC detector 116' is likewise further increased. Thus, the rate of change of the signal at summer 224 is low when the error value is less than the value S1 so as to produce low signal ripple, and a high slew rate obtains when the error value exceeds the value of S1 and a higher yet slew rate obtains when the error value exceeds the value of S2. The advantage of the arrangement of FIG. 6 is not only that the slew rate at summer 224 increases as the magnitude of the error increases, but that the slew rate is symmetrical and is also controllable in relation to the magnitude of the error value, as is illustrated in FIG. 9.

Again, where A/D converter 130 is a twos-complement 10-bit converter, its output data words have values between −512 and +511 and so the outputs from absolute value circuit 202 and low pass filter 204 have values between 0 and +511. If the value of reference 208 is at the center value, i.e. about 255, then the range of outputs produced by subtractor 206 is between −255 and +256, and is symmetrical. If, however, the value of reference source 208 is not centered, then the range of output values produced by subtractor becomes asymmetrical. For example, if the reference 208 value is 130, then the range of subtractor 206 is from −130 to +392.

If, however, the value of S1 is ±3 and the value of S2 is ±7, for example, the ability of comparator 220, current sources 222, summer 224 and filter 226 to slew the AGC signal to amplifier 126 will continue to be symmetrical. Thus, the slew rate of the AGC signal will vary depending upon the value of the error signal in relation to the threshold values S1, S2 and will be symmetrical.

In addition, the magnitude of the slew rate may be controllable in response to control values received via the standard I²C control bus from a micro controller for controlling the magnitudes of the currents generated by current source 222 in response to comparator 220. In fact, the threshold values S1, S2 and the value of reference 208 may also be adjusted in response to control values received via the I²C control bus.

While the present invention has been described in terms of the foregoing exemplary embodiments, variations within the scope and spirit of the present invention as defined by the claims following will be apparent to those skilled in the art. For example, although a receiver according to the present invention requires only a single RF tuner, IF filter and IF amplifier, it is contemplated that one or more additional RF tuners, additional SAW filters and/or IF amplifiers may be employed where certain features, such as picture-in-picture, are desired. Similarly, although a receiver according to the present invention requires only a single A/D converter for converting both NTSC and ATSC format signals, it may be convenient to utilize two A/D converters, for example, as where the NTSC section 140 and the ATSC section 150 are each available as an integrated circuit that includes an A/D converter. Suitable filters for the IF filter 120 include the preferred SAW filters and tuned L-C filters.

In addition, the carrier detectors may operate responsive to carriers other than the picture carrier and the pilot carrier, such as the chroma carrier, the sound carrier, or various synchronization signals that are unique to the type of signal, NTSC or ATSC, to be detected. Moreover, the carrier detectors need not receive input signals from the vestigial sideband filter or the VSB processor, but may receive signals from ahead of or after such filter and/or processor. The carrier detectors may also operate in direct response to the IF signal rather than to signals derived therefrom, and may be implemented in either analog or digital circuitry.

Moreover, in the AGC detector of FIG. 8B, for example, the value of the current i1 could be zero, in which case the AGC detector loop would operate in a limit cycle or "bang-bang" servo manner. Further, the threshold values S1, S2 could be other than symmetrical values for positive and negative error senses. Additional threshold values S3, S4 and so forth could also be employed to generate additional levels of currents i3, i4 and so forth. Further, the controllable sources of analog current could be replaced by sources of analog voltage, if desired.

What is claimed is:

1. A receiver comprising:
   a tuner for converting input signals to IF signals, the input signals including information in either one of an analog signal format and a digital signal format;
   an IF filter having a passband for passing the IF signals and an IF amplifier for amplifying the IF signals,
   wherein said IF amplifier and said IF filter provide an amplified and filtered IF signal including information in either one of an analog signal format and a digital signal format;
   an analog-to-digital converter coupled for converting the amplified and filtered IF signal including information in either one of an analog signal format and a digital signal format into a sequence of digital words including information in either one of an analog signal format and a digital signal format;
   a first signal processor for processing the sequence of digital words including information in the analog signal format; and
   a second signal processor for processing the sequence of digital words including information in the digital signal format.

2. The receiver of claim 1 further comprising a controllable switch for selecting an output of one of said first signal processor and said second signal processor.

3. The receiver of claim 2 further comprising a detector responsive to the sequence of digital words for controlling said controllable switch.

4. The receiver of claim 3 wherein said detector detects at least one of:
   (a) a carrier signal included in the sequence of digital words that include information in the analog signal format,
   (b) a synchronization signal included in the sequence of digital words that include information in the analog signal format,
   (c) a pilot signal included in the sequence of digital words that include information in the digital signal format, and
   (d) symbol timing included in the sequence of digital words that include information in the digital signal format.

5. The receiver of claim 3 wherein said detector is responsive to the timing and recovery of symbols included in the sequence of digital words that include information in the digital signal format.

6. The receiver of claim 1
   wherein said analog-to-digital converter samples the amplified and filtered IF signal at a sampling rate, and
   wherein the same sampling rate is employed regardless of whether the input signal includes information in an analog signal format or in a digital signal format.

7. The receiver of claim 1 wherein the input signals are television signals.

8. The receiver of claim 7
   wherein the analog signal format is selected from the group consisting of NTSC, PAL and SECAM formats, and
   wherein the digital signal format is selected from the group consisting of ATSC and DVB formats.

9. The receiver of claim 7 further comprising a display receiving picture information from a selected one of said first signal processor and said second signal processor.

10. Receiving apparatus comprising:
    means for providing a first signal at a first frequency band, wherein the first signal includes information in either one of an analog format and a digital format;
    a bandpass filter having a passband in the first frequency band for passing a channel bandwidth of the first signal;
    wherein said bandpass filter provides a filtered channel bandwidth of the first signal including information in the either one of an analog format and a digital format;
    an analog-to-digital converter coupled for converting the filtered channel bandwidth of the first signal including information in the either one of an analog signal format and a digital signal format into a sequence of digital data values including information in the either one of an analog format and a digital format; and processing means for extracting the information included in the sequence of digital data values if the information is in the analog format and if the information is in the digital format.

11. The receiving apparatus of claim 10 wherein said processing means includes:
   a first output at which a digital signal representative of information in the analog format is produced and
   a second output at which a digital signal representative of information in the digital format is produced.

12. The receiving apparatus of claim 11 further comprising control means coupled to the first and second outputs of said processing means for passing the information from the first output if the first signal includes information in the analog format and for passing the information from the second output if the first signal includes information in the digital format.

13. The receiving apparatus of claim 12 wherein said processing means further comprises detecting means responsive to the sequence of digital data values to detect the one of the analog format and digital format in which the information is formatted for controlling said control means.

14. The receiving apparatus of claim 10
   wherein said analog-to-digital converter samples the amplified and filtered IF signal at a sampling frequency,
   wherein the same sampling frequency is employed regardless of whether the first signal includes information in an analog signal format or in a digital signal format.

15. The receiving apparatus of claim 10 further comprising detecting means responsive to the sequence of digital data values for detecting the one of the analog format and digital format in which the information is formatted.

16. The receiving apparatus of claim 15 wherein said detecting means is responsive to at least one of:
   (a) a carrier signal included in the sequence of digital data values that include information in the analog format,
   (b) a synchronization signal included in the sequence of digital data values that include information in the analog format,
   (c) a pilot signal included in the sequence of digital data values that include information in the digital format, and
   (d) symbol timing included in the sequence of digital data values that include information in the digital format.

17. The receiving apparatus of claim 10 wherein the first signal is a television signal.

18. The receiving apparatus of claim 17
   wherein said analog format is selected from the group consisting of NTSC, PAL and SECAM formats, and
   wherein the digital format is selected from the group consisting of ATSC and DVB formats.

19. The receiving apparatus of claim 17 further comprising a display receiving extracted picture information from said processing means.

20. A television receiver comprising:
   a tuner for converting input television signals to IF signals, the input television signals including information in either one of an analog television signal format and a digital television signal format;
   an IF amplifier and bandpass filter coupled to said tuner and having a passband for amplifying and passing the IF signals;
   wherein said IF amplifier and bandpass filter provide an amplified and filtered IF signal including information in the either one of an analog television signal format and a digital television signal format;
   an analog-to-digital converter coupled for receiving the amplified and filtered IF signal including information in the either one of an analog television signal format and a digital television signal format for converting the amplified and filtered IF signal into a sequence of digital words including information in the either one of an analog television signal format and a digital television signal format;
   a first signal processor for processing the sequence of digital words including information in the analog television signal format; and
   a second signal processor for processing the sequence of digital words including information in the digital television signal format; and
   a display receiving picture information from a selected one of said first signal processor and said second signal processor.

21. The television receiver of claim 20 further comprising a controllable switch for coupling picture information from the selected one of said first signal processor and said second signal processor to said display.

22. The television receiver of claim 21 further comprising a detector responsive to the sequence of digital words for controlling said controllable switch.

23. The television receiver of claim 22 wherein said detector detects at least one of:
   (a) a carrier signal included in the sequence of digital words including information in the analog television signal format,
   (b) a synchronization signal included in the sequence of digital words including information in the analog television signal format,
   (c) a pilot signal included in the sequence of digital words including information in the digital television signal format, and
   (d) symbol timing included in the sequence of digital words including information in the digital television signal format.

24. The television receiver of claim 23 wherein the carrier signal detected is one of a picture carrier signal and a sound carrier signal.

25. The television receiver of claim 22 wherein said detector is responsive to the timing and recovery of symbols included in the sequence of digital words that include information in the digital television signal format.

26. The television receiver of claim 20
   wherein said analog-to-digital converter samples the amplified and filtered IF signal at a sampling rate, and
   wherein the same sampling rate is employed regardless of whether the input television signal includes information in an analog television signal format or in a digital television signal format.

27. The television receiver of claim 20
   wherein the analog television signal format is selected from the group consisting of NTSC, PAL and SECAM formats, and
   wherein the digital television signal format is selected from the group consisting of ATSC and DVB formats.

28. The television receiver of claim 20 wherein said IF amplifier and bandpass filter includes a surface acoustic wave filter.

29. A method of receiving a signal which may be in either one of an analog signal format or a digital signal format comprising:

receiving the signal as if it is in the analog signal format, and detecting a signal characteristic thereof unique to the analog signal format;

receiving the signal as if it is in the digital signal format, and detecting a signal characteristic thereof unique to the digital signal format;

responsive to the detected signal characteristics unique to the analog signal format and to the digital signal format, respectively, selecting one of the analog signal format and the digital signal format as a received signal format; and receiving the signal in the selected one of the analog signal format and the digital signal format.

30. The method of claim 29 wherein detecting a signal characteristic unique to the analog signal format includes detecting a carrier signal.

31. The method of claim 30 wherein the signal is a television signal and wherein the detecting a carrier signal includes detecting at least one of a picture carrier, a sound carrier signal, and a synchronization signal.

32. The method of claim 29 wherein the signal is a television signal and wherein detecting a signal characteristic thereof unique to the digital signal format includes detecting at least one of a pilot signal and digital symbol timing.

33. The method of claim 29 wherein the received signal includes signals in a plurality of defined channels, further comprising initiating the method upon selection of any one of the plurality of channels.

34. The method of claim 33 further comprising: storing an indication of the selected one of the analog signal format and the digital signal format corresponding to each of the plurality of channels; and, upon selecting one of the plurality of channels, initializing to receive the signal in the stored one of the analog signal format and the digital signal format corresponding to the selected one of the plurality of channels.

35. The method of claim 29 further comprising determining an indication of a signal-to-noise ratio of the received signal as if the received signal is in at least one of the analog signal format and the digital signal format; and wherein the selecting one of the analog signal format and the digital signal format is further responsive to the determined indication of the signal-to-noise ratio.

36. The method of claim 29 wherein not detecting a signal characteristic unique to a given one of the analog signal format and the digital signal format initiates receiving the signal in the other of the analog signal format and the digital signal format.

* * * * *